F. M. E. HELMER.
Devices for Multiplying Motion.
No. 156,731. Patented Nov. 10, 1874.
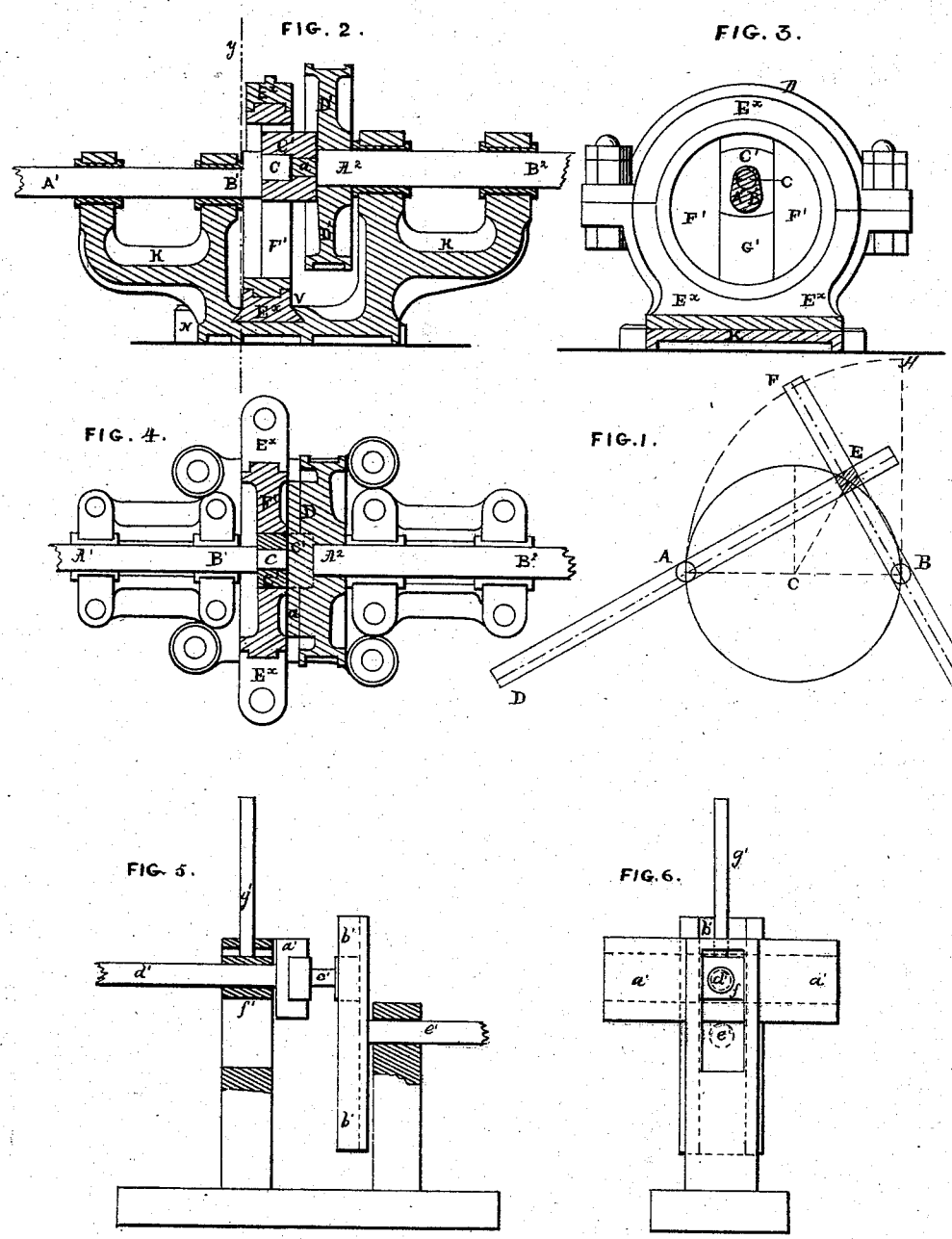

UNITED STATES PATENT OFFICE.

FRANÇOIS MARIE EUGÈNE HELMER, OF NANCY, FRANCE.

IMPROVEMENT IN DEVICES FOR MULTIPLYING MOTION.

Specification forming part of Letters Patent No. 156,731, dated November 10, 1874; application filed September 4, 1874.

*To all whom it may concern:*

Be it known that I, FRANÇOIS M. E. HELMER, of Nancy, France, have invented a new and Improved Device for Multiplying Motion; and I do hereby declare that the following is a full, clear, and exact description of the same, reference being had to the accompanying drawing, forming a part of this specification, in which—

Figure 1 is a geometrical illustration of the principle upon which the invention rests; Fig. 2, a vertical section of the device as applicable to industrial purposes; Fig. 3, detail view of disk F', collar E x, slot G', and sliding connection C'; Fig. 4, a horizontal section of device, of which Fig. 2 is a vertical section; Fig. 5, a modification of the invention, showing the adjustability of one of the axes in a vertical elevation, partly in section; Fig. 6, end view of the same.

This invention relates to a new mechanical movement. It consists in a means for multiplying motion by utilizing the increased velocity of a secondary rotation produced in a sliding connection moving on one side in a guide attached to an actuating-axis, and on the other in a guide at right angles to the first, upon an axis placed in a different plane from the first, said sliding connection being of such construction as to keep the two guides at the same angle to each other, by means of which the two guides revolve in the same direction with the same velocity, while the sliding connection runs a circumference the diameter of which is the distance between the axis of the two guides, and with a velocity twice that of the said guides and actuating-shaft.

In the drawing, Fig. 1 illustrates the geometrical principle which forms the basis of this invention. A and B represent, respectively, the two axes of the two guides E D and F G, which are placed at right angles to each other. E is a sliding connection which moves in the two guides, and causes them always to maintain the same relative angular position.

Now, the principle upon which the invention rests is that for every revolution of the guides F G and D E around their own axes B and A, respectively, the sliding connection E makes two revolutions around the center C. If we suppose the guide F G to be perpendicular— i. e., upon the line H B—the guide E D will be horizontal upon A B, because they must maintain the same right-angular position by reason of the construction of the sliding connection E and the two guides. The said sliding connection E will therefore be at the point B, because that will then be the point of junction of the two guides. Now, if the guide F G be moved from H around its axis B ninety degrees, it will then be horizontal on A B, and guide E D perpendicular, because they must be at right angles to each other. The sliding connection E will therefore rest upon A, because that is then the point of junction of the two slides. It will be observed, now, that while the guides were moving over ninety degrees the sliding connection E moved over one hundred and eighty degrees, or from B over the line B E A to A, thus rendering apparent the principle that one revolution of the guides about their axes A and B produces two revolutions of the sliding connection E about the center C.

Now, if we let the line C E represent a crank attached to an axis, C, it is easily seen that this accelerated secondary rotation may be utilized for industrial purposes.

Figs. 2, 3, and 4 are different views of the same device by means of which this is accomplished.

$A^2 B^2$ is an actuating-shaft, which corresponds to the axis B in Fig. 1. Said shaft carries a pulley, D', to which is attached a diametrical rib or guide-bar, a, shown in cross-section in Fig. 2 and longitudinal section in Fig. 4. This guide-bar a corresponds to F G in Fig. 1. C' is a sliding connection which corresponds to E of Fig. 1, and moves over guide-bar a on one side, and in a slot, G', Fig. 3, at right angles to said guide-bar, on the other. Said slot G' corresponds to guide E D, and is contained in a disk, F', which moves inside a collar, E x, upon its own periphery for an axis. The center of this disk corresponds to the axis A of Fig. 1, and the distance from this center to the center of shaft $A^2 B^2$ is the diameter of the circle described by the sliding connection C', and corresponds to the distance A B in Fig. 1. $A^1 B^1$ is a shaft, which corresponds to the point C of Fig. 1, and around which the sliding connection C' revolves, the said sliding connection being attached to the said shaft by a crank through the stud $c$, which said crank corresponds to the radius C E in Fig. 1.

Having thus shown the adaptation of these devices to practical operation upon the principle illustrated in Fig. 1, it is easily seen how one revolution of shaft $A^2 B^2$ produces two revolutions in shaft $A^1 B^1$.

If it be desired to more than double the motion, this can be accomplished by arranging a number of the devices in a line, each of which will double the motion imparted to it, and the velocity by this means be multiplied *ad infinitum*.

Figs. 5 and 6 represent a modification of the devices shown in Figs. 2, 3, and 4, in which one of the shafts, $d'$, of the two guides $a' b'$ is made adjustable through the rod $g'$ and adjustable bearing $f'$. By means of this adjustment the diameter of the circumference of the secondary rotation—i. e., the distance from $d'$ to $e'$—may be varied for a greater or less leverage for the crank.

It is necessary, however, for the successful application of the principle of my invention, that the two axes of the slides be placed in different planes with respect to each other; for, were they concentric, there would be no secondary rotation, and the principle would be lost.

Having thus described my invention, what I claim as new is—

Two guides placed at right angles to each other, and revolving upon separate axes arranged parallel to each other, in combination with a single sliding connection which moves in both said guides, for the purpose of producing a secondary rotation of an accelerated velocity equal to double the original velocity imparted to said guides, substantially as described.

FRANÇOIS MARIE EUGÈNE HELMER.

Witnesses:
   A. COLHINET,
   ERARD.